US012147173B2

(12) United States Patent
Inaba et al.

(10) Patent No.: US 12,147,173 B2
(45) Date of Patent: Nov. 19, 2024

(54) TRANSFER UNIT, IMAGE FORMING APPARATUS, AND METHOD FOR MANUFACTURING TRANSFER UNIT, WITH END SEAL MEMBER ABUTTING AGAINST CLEANING BLADE AND INTERMEDIATE TRANSFER BELT THAT ABUT AGAINST EACH OTHER

(71) Applicant: CANON KABUSHIKI KAISHA, Tokyo (JP)

(72) Inventors: Yuichiro Inaba, Kanagawa (JP); Norihiro Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/170,567

(22) Filed: Feb. 17, 2023

(65) Prior Publication Data

US 2023/0288844 A1 Sep. 14, 2023

(30) Foreign Application Priority Data

Mar. 8, 2022 (JP) ................................ 2022-034925

(51) Int. Cl.
*G03G 15/16* (2006.01)
*G03G 21/00* (2006.01)

(52) U.S. Cl.
CPC ......... *G03G 15/16* (2013.01); *G03G 21/0011* (2013.01); *G03G 15/161* (2013.01); *G03G 2221/1648* (2013.01)

(58) Field of Classification Search
CPC .................. G03G 21/0011; G03G 2221/1648
See application file for complete search history.

(56) References Cited

U.S. PATENT DOCUMENTS 6,035,158 A * 3/2000 Asakura ............ G03G 15/0131 399/302
9,176,434 B2 11/2015 Tanaka
(Continued)

FOREIGN PATENT DOCUMENTS

JP H08-202242 A 8/1996
JP 2002116672 A * 4/2002
(Continued)

OTHER PUBLICATIONS

Machine translation of JP 2011-237631 (Year: 2011).*
Apr. 18, 2023 Japanese Official Action in Japanese Patent Appln. No. 2022-034925.

*Primary Examiner* — Arlene Heredia
(74) *Attorney, Agent, or Firm* — Venable LLP

(57) ABSTRACT

A transfer unit transferring a developer image onto a transfer medium includes: (1) an image bearing member on which the developer image is formed; (2) a cleaning member provided to extend in a width direction of the image bearing member to abut thereagainst, and remove developer on the image bearing member; and (3) a seal member that prevents the developer removed by the cleaning member from leaking outside the transfer unit. The seal member opposes a tip portion of the cleaning member. In the transfer unit, a first unit is provided with the image bearing and cleaning members, and a second unit is provided with the seal member and can engage with the first unit. The second unit engages with the first unit so that the seal member abuts against the cleaning and image bearing members.

15 Claims, 12 Drawing Sheets

(56) References Cited

U.S. PATENT DOCUMENTS

| | | | | |
|---|---|---|---|---|
| 10,295,950 | B2 * | 5/2019 | Iwakawa | G03G 15/168 |
| 11,054,758 | B2 * | 7/2021 | Matsumoto | G03G 15/0865 |
| 2016/0246243 | A1 * | 8/2016 | Kitagawa | G03G 21/0011 |
| 2017/0176926 | A1 * | 6/2017 | Boettcher | G03G 21/1828 |
| 2021/0132539 | A1 * | 5/2021 | Inaba | G03G 15/161 |
| 2021/0325817 | A1 * | 10/2021 | Ninomiya | G03G 15/1605 |

FOREIGN PATENT DOCUMENTS

| | | | | |
|---|---|---|---|---|
| JP | 2004021141 | A | * | 1/2004 |
| JP | 2006-030491 | A | | 2/2006 |
| JP | 2006030863 | A | * | 2/2006 |
| JP | 2007171818 | A | * | 7/2007 |
| JP | 2011-237631 | A | | 11/2011 |
| JP | 2013-235143 | A | | 11/2013 |
| JP | 2014-056185 | A | | 3/2014 |
| JP | 2015-172636 | A | | 10/2015 |

* cited by examiner

TRANSFER UNIT, IMAGE FORMING APPARATUS, AND METHOD FOR MANUFACTURING TRANSFER UNIT, WITH END SEAL MEMBER ABUTTING AGAINST CLEANING BLADE AND INTERMEDIATE TRANSFER BELT THAT ABUT AGAINST EACH OTHER

BACKGROUND OF THE INVENTION

Field of the Invention

The present invention relates to a transfer unit, an image forming apparatus including the transfer unit, and a method for manufacturing the transfer unit.

Description of the Related Art

Some known electrophotographic image forming apparatuses such as printers based on electrophotographic process include an image bearing member, such as a photosensitive drum and a transfer belt on which a toner image is transferred, and a cleaning device for removing waste toner remaining on the image bearing member. The cleaning device includes a cleaning frame, a cleaning blade supported by the cleaning frame to contact the image bearing member, and a storing portion that stores removed waste toner. In order to prevent the removed toner from leaking to the outside until the toner is transported to the storing portion, the cleaning device is generally provided with seal members.

However, in order to obtain high sealing performance, each seal member must be attached with high precision, which has been a factor of increasing manufacturing costs. In particular, an end seal member for sealing a gap between the cleaning blade and the image bearing member and the frame that transports waste toner at a longitudinal end of the cleaning blade requires a high degree of attachment precision. In such a cleaning device disclosed in Japanese Patent Application Publication No. 2014-056185, an elastic member that elastically deforms to fill the gap between the end seal member and the cleaning blade is injection-molded directly at the cleaning frame.

SUMMARY OF THE INVENTION

In the above case, the end seal member and the cleaning blade are attached in a simplified manner by injection-molding the elastic member having a special shape directly at the cleaning frame. However, a special manufacturing device is necessary for injection-molding the elastic member at the cleaning frame, which may give rise to increase in manufacturing costs.

Therefore, it is an object of the present invention to provide an image forming apparatus having a transfer unit exhibiting high sealing performance on waste toner and having a superior cost performance.

In order to achieve the object, a transfer unit that transfers a developer image onto a transfer medium according to the invention includes:

an image bearing member on which the developer image is formed;

a cleaning member provided to extend in a width direction of the image bearing member to abut against the image bearing member, and remove a developer on the image bearing member; and a seal member that prevents the developer removed by the cleaning member from leaking outside the transfer unit, the seal member being opposed to a tip portion of the cleaning member in a direction orthogonal to the width direction near the end of the cleaning member in the width direction, the transfer unit further comprising a first unit provided with the image bearing member and the cleaning member, and a second unit provided with the seal member to engage with the first unit, wherein the second unit engages with the first unit so that the seal member abuts against the cleaning member and the image bearing member that abut against each other.

According to the present invention, an image forming apparatus with a transfer unit exhibiting high sealing performance on waste toner and having a superior cost performance can be provided.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

General Structure of Image Forming Apparatus

Figure 1:
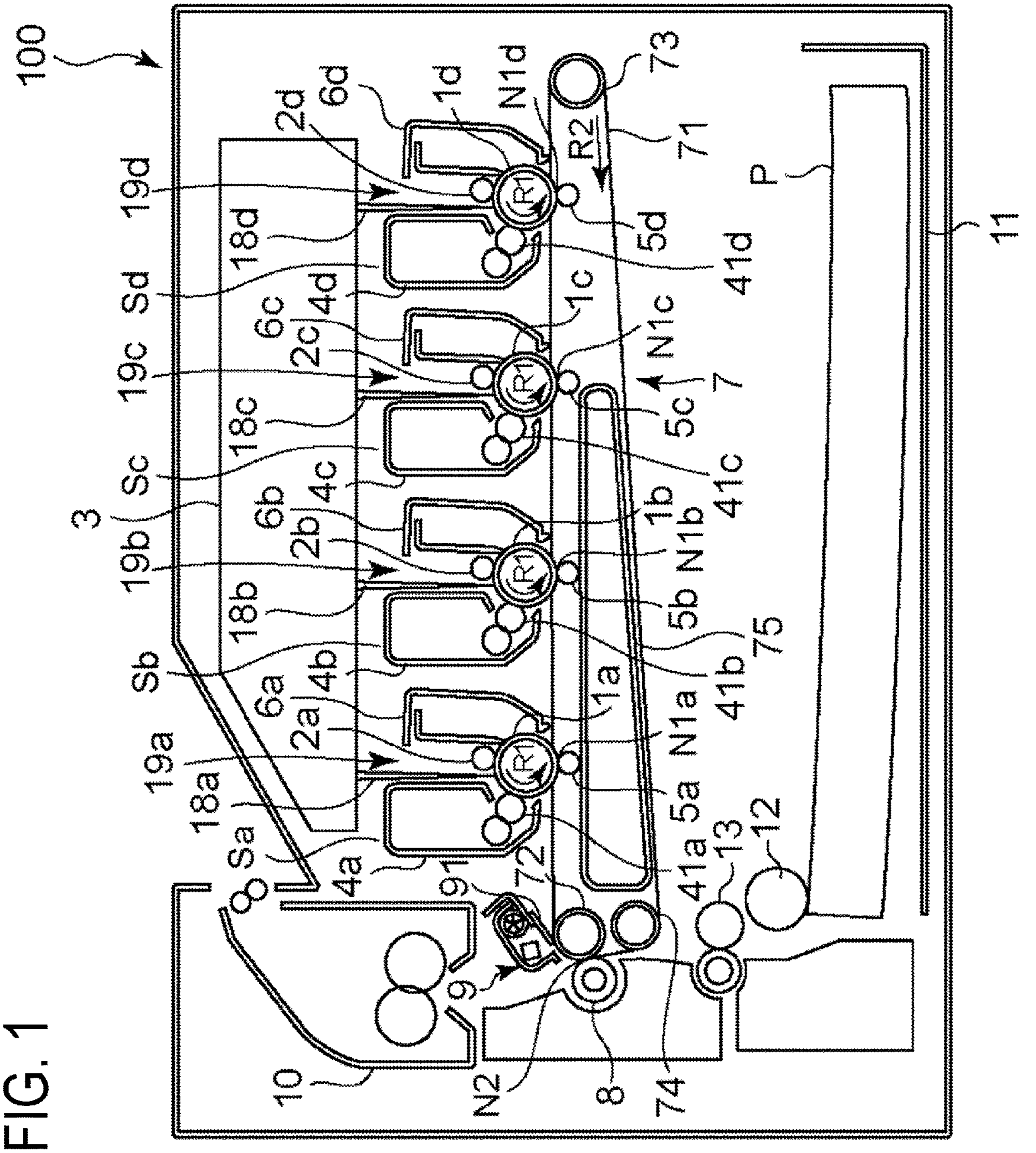
FIG. 1 is a schematic sectional view of an image forming apparatus according to an embodiment of the invention.

With reference to FIG. 1, a general structure of an image forming apparatus 100 will be described. In the following description of the embodiment, the invention is applied to a color laser beam printer based on a four-drum system and a process cartridge system and capable of forming full-color images using the electrophotographic method. Here, the process cartridge system refers to a system that includes, as a process cartridge, developing means as process means for performing image forming process and an electrophotographic image bearing member (photosensitive drum) in an integrated form, so that the process cartridge can be detachably provided to the main body of the image forming apparatus.

The image forming apparatus 100 according to the embodiment operates according to the intermediate transfer system according to which toner images in various colors formed according to image information divided into the color components of yellow, magenta, cyan, and black are placed on the intermediate transfer member by primary transfer and then transferred on a transfer material P by secondary transfer. To start with, the general structure and operation of the image forming apparatus according to the embodiment will be described.

The image forming apparatus 100 has four image forming portions (stations) for forming toner images in yellow, magenta, cyan, and black as multiple image forming portions or first, second, third, and fourth image forming portions Sa, Sb, Sc, and Sd. According to the embodiment, the structure and operation of the image forming portions Sa to Sd are substantially the same in many ways except for the color of the toner image formed by each unit. Therefore, in the following description, when no particular distinction is necessary, suffixes a, b, c, and d given to reference characters to indicate that each is an element provided for one of the colors are omitted and description will be given collectively.

The image forming portion S has a drum type photosensitive member, i.e., a photosensitive drum 1 as an image bearing member. The photosensitive drum 1 is driven to rotate in the direction indicated by the arrow R1 (counterclockwise) in FIG. 1 by driving means (not shown). According to the embodiment, the photosensitive drum 1 has an OPC (organic photoconductor) photosensitive layer. The image forming portion S has a charging roller 2 as charging means for charging the photosensitive drum 1, an exposure device 3 as exposure means, and a developing apparatus 4 as developing means around the photosensitive drum 1. The image forming portion S also has a primary transfer member 5 as primary transfer means and a cleaning device 6 as cleaning means around the photosensitive drum 1. The members are arranged in the rotating direction of photosensitive drum 1 in the order of the charging roller 2, the exposure device 3, the developing apparatus 4, the primary transfer member 5, and the cleaning device 6.

The cleaning device 6 has a cleaning member such as a fur brush and a blade used to scrape off waste toner on the photosensitive drum 1 and a toner collecting container to collect waste toner or the like removed from the photosensitive drum 1 by the cleaning member. Various seal members are provided to seal the gaps between the members to prevent leakage of the removed waste toner.

The developing apparatus 4 develops electrostatic latent images by reversal development. More specifically, the developing apparatus 4 forms a toner image on the photosensitive drum 1 by depositing toner charged with the same polarity as that of the photosensitive drum 1 (negative polarity according to the embodiment) onto an area (bright portion) on the photosensitive drum 1 where the charge has decreased due to exposure after the charging processing. The developing apparatus 4 also forms a toner image as a developer image by using a non-magnetic one component developer or toner as a developer according to the embodiment. The developing apparatus 4 is configured to carry the toner on a developing roller 41 as a developer carrying member using a developer application blade (not shown) as a developer restricting member and transports the toner to the part (developing portion) opposed to the photosensitive drum 1.

The exposure device 3 may be a laser scanner unit that emits a laser beam by a polygon mirror or an LED array, and a laser scanner is used according to the embodiment. The exposure device 3 directs a scanning beam 18 modulated on the basis of an image signal on the photosensitive drum.

According to the embodiment, the photosensitive drum 1, the charging roller 2, the developing apparatus 4, and the cleaning device 6 as process means acting on the photosensitive drum 1 are integrated into a cartridge to form a process cartridge 19 that can be detachably attached to the main body of the image forming apparatus (apparatus body). The process cartridge 19 is a transfer unit for performing primary transfer that will be described.

On the other hand, an intermediate transfer belt 71 including a movable, endless belt member as an intermediate transfer member is arranged to abut against all four photosensitive drums 1*a* to 1*d*. At the primary transfer portion N1 (primary transfer nip) which is a contact area between the intermediate transfer belt 71 and each of the photosensitive drum 1*a* to 1*d*, toner is transferred (primary transfer) from each of the photosensitive drum 1*a* to 1*d* to the intermediate transfer belt 71 as a transfer medium. The intermediate transfer belt 71 is stretched on three rollers as its tension members, a driving roller 72, a tension roller 73, and a driven roller 74, so that appropriate tension is maintained. When the driving roller 72 is driven to rotate, the intermediate transfer belt 71 moves at substantially the same speed in the forward direction with respect to the photosensitive drum 1 at each of the primary transfer portions N1. More specifically, the intermediate transfer belt 71 rotates in the direction indicated by the arrow R2 (clockwise) shown in FIG. 1.

Primary transfer members 5*a* to 5*d* as primary transfer means corresponding to the photosensitive drums 1*a* to 1*d* are arranged at positions opposed to the photosensitive drums 1*a* to 1*d* respectively with the intermediate transfer belt 71 therebetween. The primary transfer members 5*a* to 5*d* are arranged in contact with the surface (back surface) opposite to the surface of the intermediate transfer belt 71 that bears the toner image.

A secondary transfer roller (secondary transfer member) 8 as secondary transfer means is arranged to abut against the intermediate transfer belt 71 at a position opposed to the driving roller 72 with the intermediate transfer belt 71 therebetween. A secondary transfer roller 8 contacts the surface of the intermediate transfer belt 71 that bears the toner image. In the secondary transfer portion N2 (secondary transfer nip) which is the contact area between the intermediate transfer belt 71 and the secondary transfer roller 8, the toner image is transferred (secondary transfer) from the intermediate transfer belt 71 to a transfer material P as a transfer medium. More specifically, according to the embodiment, the photosensitive drum 1 and the intermediate transfer belt 71 are provided as image-bearing members, and the toner image formed on the photosensitive drum 1 is transferred to the transfer material P through the intermediate transfer belt 71.

The charging roller 2 is connected to a charging power supply (not shown) which is means for applying voltage to the charging roller 2. The developing roller 41 of the developing apparatus 4 is connected to a developing power supply (not shown) which is means for applying voltage to the developing roller 41. The primary transfer member 5 is connected to a primary transfer power supply (not shown) which is means for applying voltage to the primary transfer member 5. The secondary transfer roller 8 is connected to a secondary transfer power supply (not shown) which is means for applying voltage to the secondary transfer roller 8.

Image Forming Process

Now, the image forming process will be described with reference to the case of forming full-color images as an example. When image forming operation starts, the photosensitive drums 1*a* to 1*d*, the intermediate transfer belt 71, and other elements start rotating in respective prescribed directions at prescribed process speed.

The photosensitive drum 1 is uniformly charged to a prescribed polarity (negative polarity according to the embodiment) by applying a charging bias from the charging power supply (not shown) to the charging roller 2. Subsequently, an electrostatic image (latent image) according to image information is formed on the charged photosensitive drum 1 by the scanning beam 18 from the exposure device 3. The electrostatic image formed on the photosensitive drum 1 arrives at the part (developing portion) opposed to the developing roller 41 of the developing apparatus 4 as the photosensitive drum 1 rotates.

The toner in the developing apparatus 4 is charged to the normal charge polarity (negative polarity according to embodiment) by the developer application blade and is applied on the developing roller 41. By applying a developing bias from the developing power supply (not shown) to the developing roller 41, the electrostatic image on the photosensitive drum 1 is visualized by the toner of negative polarity, and a toner image as a developer image is formed on the photosensitive drum 1.

Then, the toner image formed on the photosensitive drum 1 is transferred as primary transfer onto the intermediate transfer belt 71 in the primary transfer portion N1. At the time, a bias of the opposite polarity (positive polarity according to the embodiment) to the normal charging polarity of the toner is applied to the primary transfer member 5 from the primary transfer power supply.

After the primary transfer step, the toner remaining on the photosensitive drum 1 (primary transfer residual toner) is removed from the surface of the photosensitive drum 1 by the cleaning device 6 and collected.

The above steps of charging, exposure, development, and primary transfer are performed in the first to fourth image forming portions Sa to Sd, so that color toner images are sequentially superimposed and transferred onto the intermediate transfer belt 71 to form a multi-image as a developer image on the intermediate transfer belt 71. At the time, an electrostatic image is formed by exposure on each of the photosensitive drums 1*a* to 1*d* while delaying a writing signal from the controller (not shown) at a certain timing for each color according to the distance between primary transfer positions for the colors, and this electrostatic image is developed and transferred as primary transfer.

Then, as the electrostatic image is formed by the exposure, the transfer material P loaded in a cassette 11 is picked up by a transfer medium supply roller 12 and transported to a resist roller 13. The transfer material P is then transported by the resist roller 13 to the secondary transfer portion N2 in synchronization with the toner image on the intermediate transfer belt 71. At the time, a bias of the opposite polarity (positive polarity according to the embodiment) to the normal charging polarity of the toner is applied to the secondary transfer roller 8 by the secondary transfer power supply. As a result, the four-color multi-toner image carried on the intermediate transfer belt 71 is transferred (secondary transfer) onto the transfer material P at a time.

After the secondary transfer step, the toner remaining on the intermediate transfer belt 71 (secondary transfer residual toner), paper dust, and the like generated as the transfer material P is conveyed are removed from the surface of the intermediate transfer belt 71 and collected by the belt cleaning device 9. According to the embodiment, the belt cleaning device 9 uses a blade 91 having an elastic portion for example made of urethane rubber and placed abutted against the intermediate transfer belt 71 to scrape off the materials sticking on the intermediate transfer belt 71. The sticking materials scraped off by the blade 91 as a cleaning member are transported and collected in a collecting container 75 provided on the inner side of the intermediate transfer belt 71. The detailed structure of the belt cleaning device 9 as a cleaning device for the intermediate transfer belt 71 will be described in the following.

According to the embodiment, the intermediate transfer belt 71, the belt cleaning device 9, and the collecting container 75 are formed as a unit in an integrated manner as an intermediate transfer unit 7 which is detachable from the main body of the image forming apparatus 100. The intermediate transfer unit 7 is a transfer unit for performing secondary transfer. More specifically, the image forming apparatus 100 is provided with two types of transfer units as transfer means, the process cartridge 19 for primary transfer and the intermediate transfer unit 7 for secondary transfer.

The transfer material P onto which the toner image has been transferred is transported to the fixing apparatus 10 as fixing means (fixing unit), where the toner image on thereon is melt-mixed and fixed, and then discharged externally from the image forming apparatus 100 as a full color image product (a print or a copy).

The image forming apparatus 100 can also form a single or full-color image by forming images only in a desired single or multiple (not all) image forming portions S.

The above described image forming apparatus is a typical example of a tandem type color laser printer in which two or more kinds of color toners are transferred onto a recording material through an intermediate transfer belt to form an image. However, the invention may be applied to other than the above and can also be applied to monochrome laser printers using single color monochrome toner.

Intermediate Transfer Unit

Figure 2:
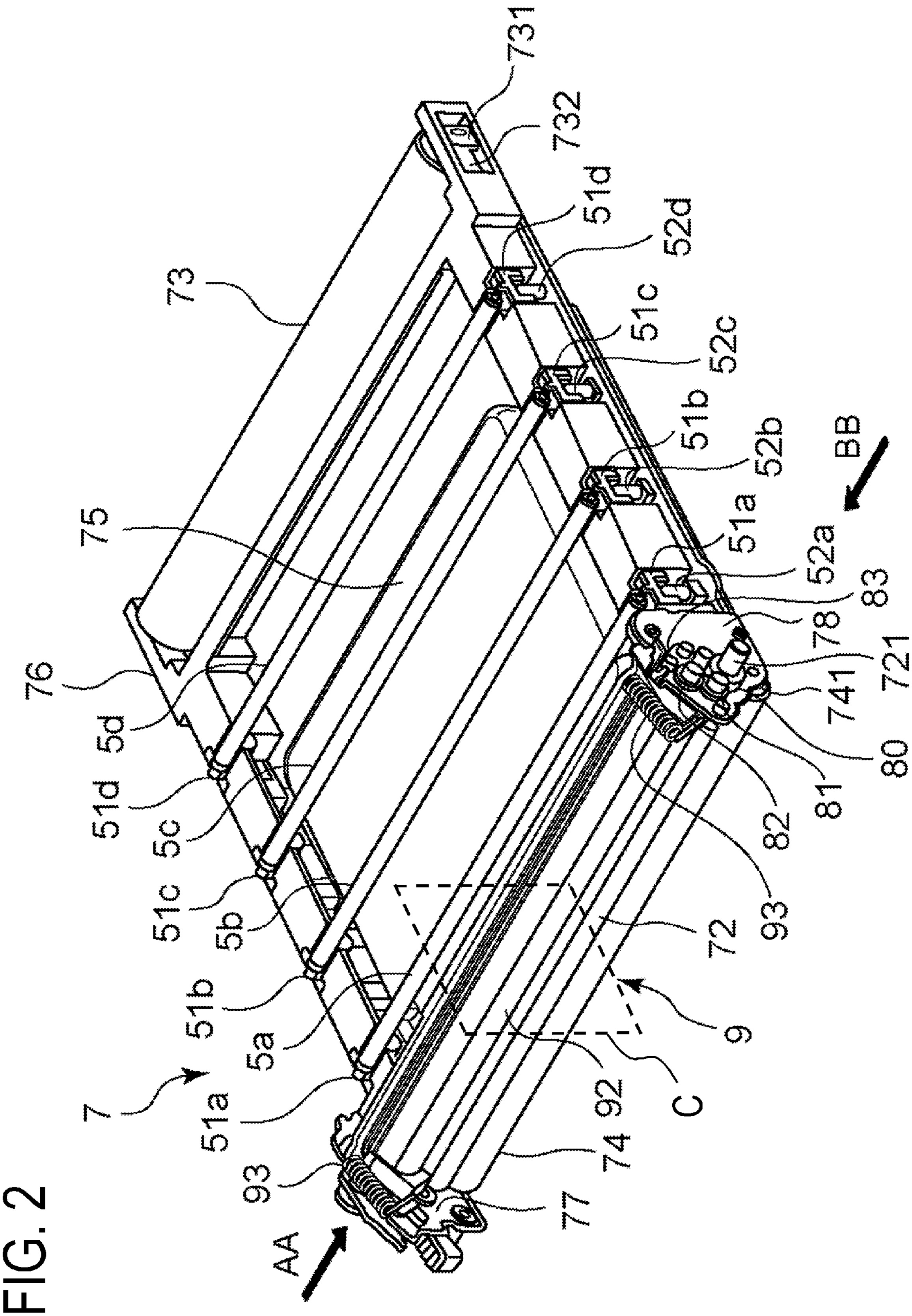
FIG. 2 is a perspective view of an intermediate transfer unit according to the embodiment.
Figure 3B:
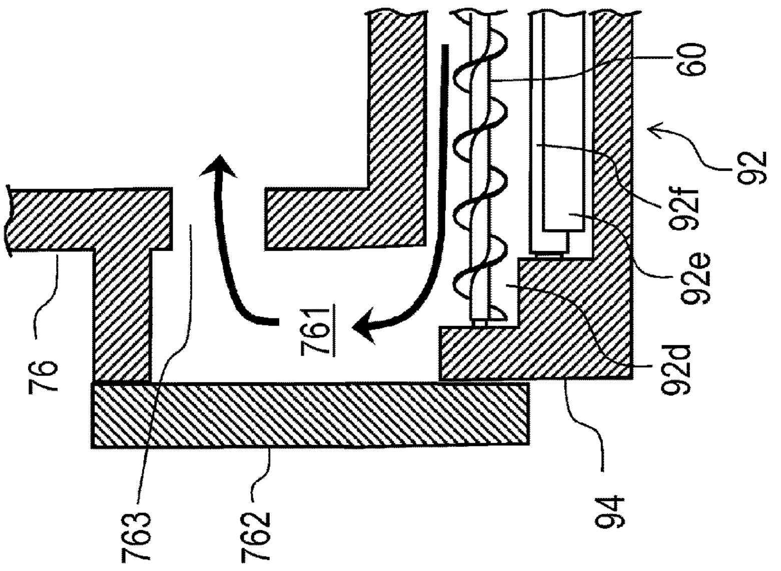
FIGS. 3A and 3B are views of a waste toner transport path in the intermediate transfer unit according to the embodiment.
Figure 3A:
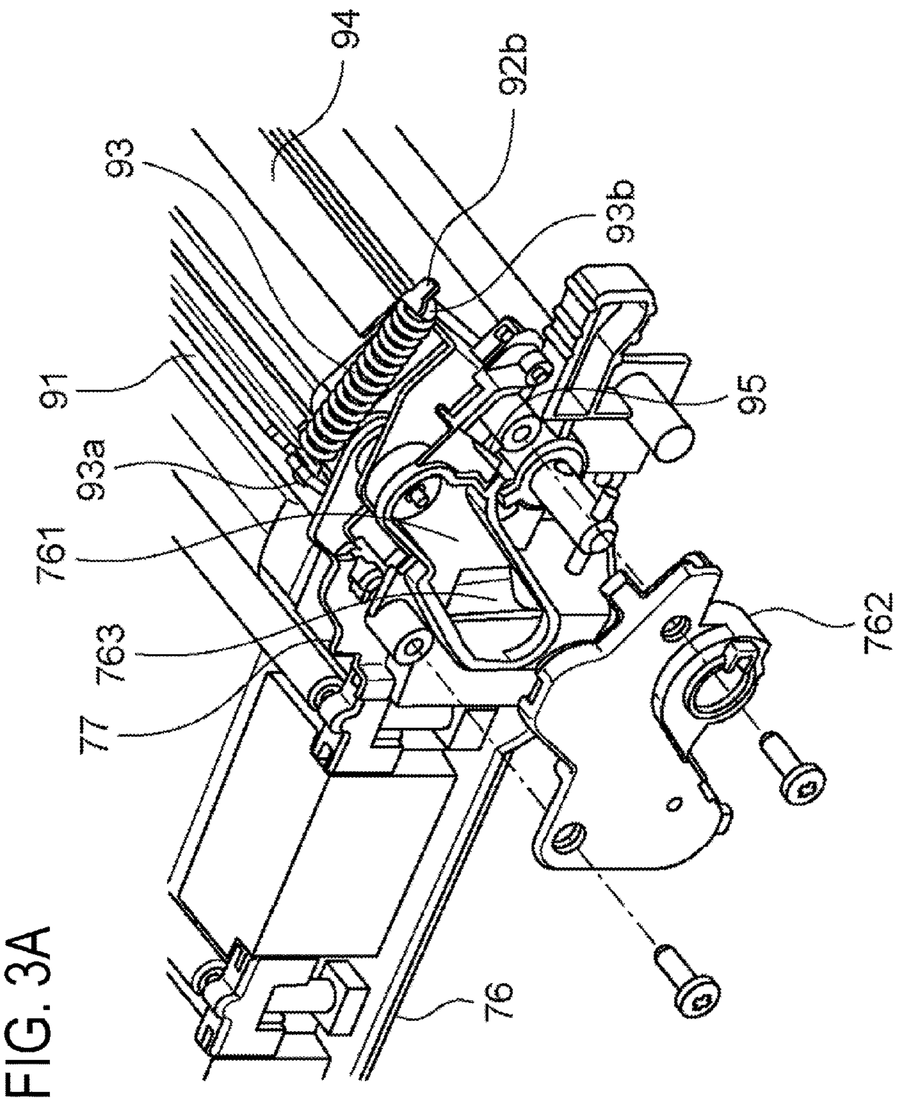
Figure 4:
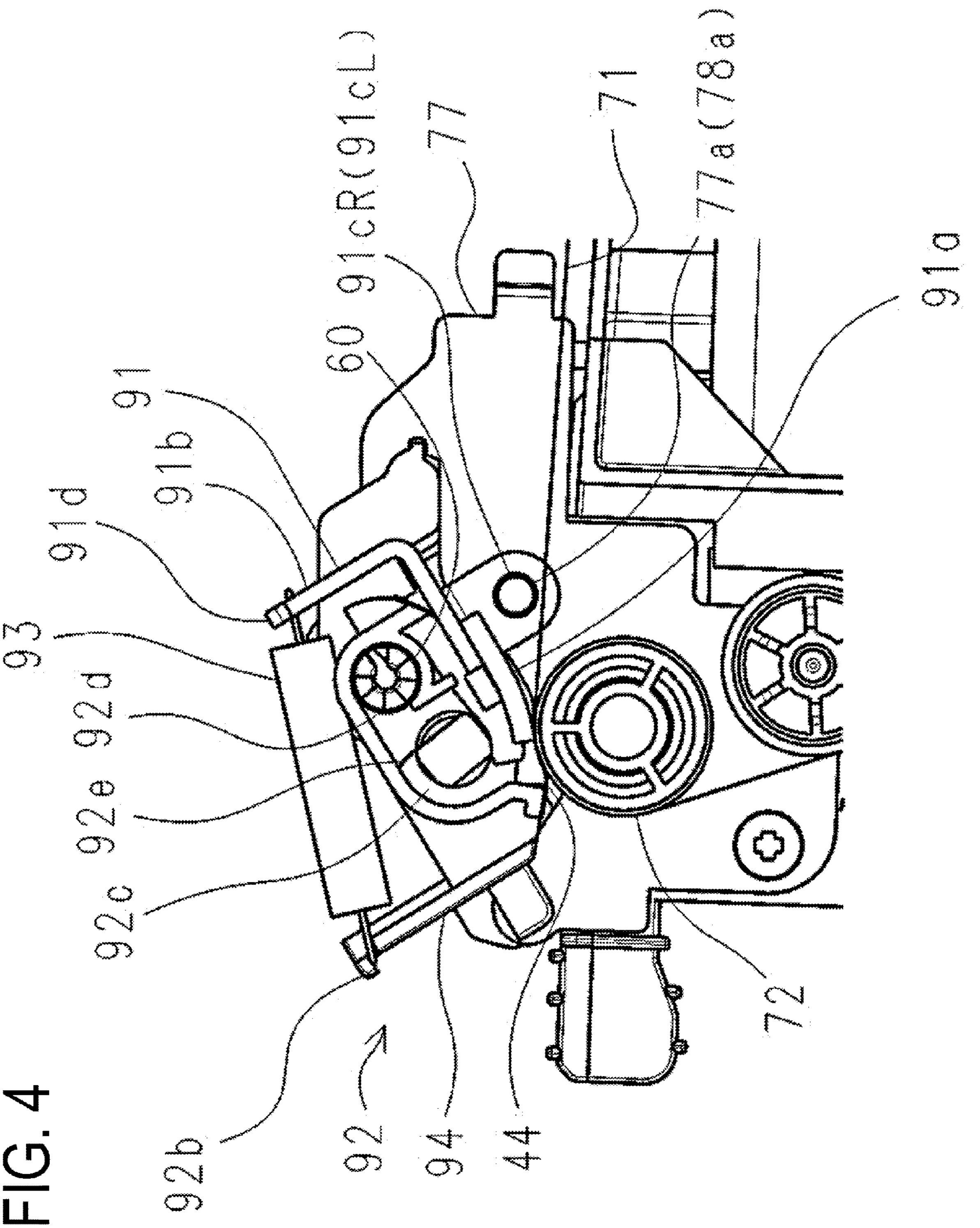
FIG. 4 is a sectional view of a cleaning device according to the embodiment.

With reference to FIGS. 2, 3A, 3B, and 4, the intermediate transfer unit 7 will be described. FIG. 2 is a perspective view of the intermediate transfer unit 7, and the intermediate transfer belt 71 is not shown to illustrate the inside structure. FIG. 3A is a schematic exploded perspective view of the intermediate transfer unit 7 in FIG. 2 when viewed in the direction indicated by the arrow AA, illustrating the structure of the belt cleaning device 9 as cleaning means. FIG. 3B is a schematic cross-sectional view of the general structure of the toner transport path from the inside of a toner transport portion 92 as a toner transport portion to the inlet 763 of the collecting container 75 through a toner transport path 761. FIG. 4 is a schematic cross-sectional view of the section C of the intermediate transfer unit 7 in FIG. 2 when viewed in the direction indicated by the arrow BB.

The intermediate transfer unit 7 supports the intermediate transfer belt 71 stretched on the three tensioning rollers, the driving roller 72, the tension roller 73, and the driven roller 74. According to the embodiment, the width direction of the intermediate transfer belt 71 is parallel to the direction of the rotation axis of the driving roller 72 and the tension roller 73.

The driving roller 72 is rotatably supported by bearings 721 at opposed ends thereof in the direction of the rotation axis and rotates as prescribed rotational driving force is transmitted from the apparatus body at one end in the direction of the rotation axis. In the following description, the side to which the driving force is transmitted will be referred to as the driving side (the side where the support plate 77 is provided in FIG. 2), and the opposite side will be referred to as the non-driving side (the side where the support plate 78 is provided in FIG. 2). According to the embodiment, the driving roller 72 is made by press-fitting a metal shaft, for example of SUS, into the opposed ends of a pipe of about 25 mm in diameter, obtained by coating an aluminum core with rubber having as a conductive agent dispersed therein.

The tension roller 73 is made of an aluminum metal rod having a diameter of about 25 mm, and bearings 731 are provided at the opposed ends of the tension roller 73 in the direction of the rotation axis. The bearings 731 are urged by the compression springs 732, so that the ends of the tension roller 73 are urged to apply prescribed tension to the intermediate transfer belt 71. The driven roller 74 as an auxiliary roller similarly includes an aluminum metal rod, and the opposed ends thereof in the direction of the rotation axis are rotatably supported by bearings 741.

A primary transfer member 5 is provided in a position corresponding to the photosensitive drum 1 with the intermediate transfer belt 71 therebetween. The primary transfer member 5 is supported through bearings 51 at the ends in the direction of the rotational axis and is urged toward the intermediate transfer belt 71 by compression springs 52 through the bearings 51 with prescribed force to rotate as the intermediate transfer belt 71 rotates. According to the embodiment, a roller made of a metal shaft such as SUS with a diameter of about 6 mm is used as the primary transfer member 5. At least one of the bearings 51 provided at the opposed ends is made of a conductive material, and application of voltage of positive polarity to the primary transfer member 5 from a primary transfer power supply (not shown) causes the toner image to be transferred from the photosensitive drum 1 to the intermediate transfer belt 71 as primary transfer.

The intermediate transfer belt 71 can be made of a material such as rubber and resin as appropriate. According to the embodiment, the intermediate transfer belt 71 is a film in the form of an endless belt of a resin material having a thickness of about 60 μm and medium resistivity in the direction orthogonal to the direction of movement of the intermediate transfer belt 71 and the direction of the rotation axis of each of the tension rollers.

A frame 76 is used to support each of the tension rollers and is made of a molded resin material. The bearings 51 that support the primary transfer member 5 at the opposed ends in the direction of rotation axis and the bearings 731 that support the tension rollers 73 at the opposed ends in the direction of the rotation axis are supported by the frame 76 movably in the direction in which each of the compression springs pressurizes the frame 76.

Support plates 77 and 78 which rotatably support the driving roller 72 and the driven roller 74 through the respective bearings are provided in the vicinity of the driving roller 72 supported by the frame 76. The support plates 77 and 78 are fixed by screws on the side of opposed ends in the direction of the rotation axis of the driving roller 72 in a positioned state with respect to the frame 76. According to the embodiment, the support plates 77 and 78 are each a pressed sheet metal. The support plate 77 is provided on the driving side and the support plate 78 is provided on the non-driving side in the direction of the rotation axis of the driving roller 72, and each function as a frame.

As shown in FIGS. 2, 3A, 3B, and 4, the belt cleaning device 9 has the blade 91 as a cleaning member and the toner transport portion 92 that transports and collects toner removed from the intermediate transfer belt 71 by the blade 91. Both the blade 91 and the toner transport portion 92 extend in the width direction of the intermediate transfer belt 71 and are fixed to the support plate 77 and the support plate 78, respectively in a positioned state.

Toner removed from the intermediate transfer belt 71 by the blade 91 is temporarily stored inside the toner transport portion 92. As shown in FIG. 3B, the toner is then transported inside the toner transport portion 92 and collected into the collecting container 75 through the toner transport path 761 provided on the driving side of the frame 76. As shown in FIG. 3A, the toner transport path 761 is sealed by fastening the transfer path cover 762 to the container body 94, for example with screws, so that the toner can be prevented from leaking outside in the intermediate transfer unit 7.

The collecting container 75 includes molded resin parts and is configured as a container having its outer circumference sealed by bonding the plurality of resin parts. The collecting container 75 is fixed to the frame 76 by screws or other means. The collecting container 75 is also provided with detection means (not shown) such as an optical sensor for detecting when the container is filled with toner. This makes it possible to inform the user of the replacement time for the collecting container 75. The collecting container 75 that has become full can be replaced with a new one as a service person or the user replaces the intermediate transfer unit 7.

Belt Cleaning Device

The belt cleaning device 9 will be described in more detail with reference to FIGS. 2, 3A, 3B, and 4. As described above, the belt cleaning device 9 has the blade 91 and the toner transport portion 92 for temporarily storing toner removed from the intermediate transfer belt 71 by the blade 91 and transporting the toner to the collecting container 75. As shown in FIG. 4, the blade 91 has a urethane rubber part 91*a* as an elastic portion and a retention sheet metal 91*b* as a retention part to which the urethane rubber part 91*a* is adhered. In the longitudinal direction of the urethane rubber part 91*a* (parallel to the width direction of the intermediate transfer belt 71), the length of the urethane rubber part 91*a* is set to a width longer than the image forming area of the intermediate transfer belt 71 that can bear a toner image. The urethane rubber part 91*a* extends in a direction orthogonal to the longitudinal direction of the blade 91 and is arranged to have its tip portion pressed against the intermediate transfer belt 71. The blade 91 can remove residual toner from the intermediate transfer belt 71 when the tip portion of the urethane rubber part 91*a* abuts against the intermediate transfer belt 71.

Here, the blade 91 must be pressed against the intermediate transfer belt 71 with prescribed pressure in order to remove the toner securely. According to the embodiment, the prescribed pressure is secured by placing the blade 91 opposed to at least one of the plurality of tension rollers that holds the intermediate transfer belt 71 in a stretched manner. More specifically, the blade 91 is opposed to and in contact with the driving roller 72 at a position downstream of the secondary transfer portion N2 with respect to the direction of movement of the intermediate transfer belt 71 and above the driving roller 72 in the direction of gravity.

In the longitudinal direction of the blade 91, holes 91*c*R and 91*c*L are provided at opposed ends of the retention sheet metal 91*b* for supporting the blade 91 in a rotatable manner, and a spring peg 91*d* for hanging a spring that urges the blade 91 in a direction to press the blade 91 against the intermediate transfer belt 71 is provided. The blade 91 is engaged, through the holes 91*c* at opposed ends, with the metal blade support shafts 77*a* and 78*a* which are press-fitted to the support plates 77 and 78 and is supported in a detachable and rotatable state with respect to the intermediate transfer belt 71. Hereinafter, members provided on both sides of the driving and non-driving sides such as the holes 91*c*R and 91*c*L may be described with suffixes R and L attached to the reference characters, but when there is no need to distinguish between the respective members, the suffixes R and L will be omitted.

The spring pegs 91*d* provided at the longitudinal ends of the blade 91 and the spring pegs 94*d* provided at the longitudinal ends of the container body 94 which constitutes the toner transport portion 92 respectively engage with hooks 93*a* and 93*b* provided at opposed ends of the tension spring 93 in the extension/contraction direction. More specifically, as shown in FIGS. 3A, 3B and 4, the spring peg 91*d* engages with the hook 93*a* and the spring peg 94*d* engages with the hook 93*b*, so that the spring peg 91*d* and the spring peg 94*d* are bridged by the tension spring 93. As a result, the tension spring 93 as an biasing member generates a moment at the blade 91 around the holes 91*c*R and 91*c*L, and the blade 91 is pressed against and contacts the intermediate transfer belt 71 under the prescribed pressure.

In the toner transport portion 92, a plurality of seal members are attached to the container body 94, for example by double-sided tape, to prevent toner collected from the intermediate transfer belt 71 from leaking out of the container body 94. A sheet member 44 that abuts against the intermediate transfer belt 71 and seals the gap between the toner transport portion 92 and the intermediate transfer belt 71 is provided upstream of the cleaning unit where the blade 91 and the intermediate transfer belt 71 contact in the direction of movement of the intermediate transfer belt 71. The detailed structure of the seal members including the sheet member 44 will be described in the following. The toner temporarily stored in the toner transport portion 92 is transported from the belt cleaning device 9 to the collecting container 75 without leaking outside.

Toner Transport

The toner transport portion 92 has a waste toner storing portion 92*c* that temporarily stores toner removed by the blade 91 and a waste toner transport portion 92*d* that transports the stored toner in the longitudinal direction of the blade 91. The waste toner storing portion 92*c* has a rotating shaft 92*f* with a flexible sheet member 92*e* having a thickness of about 80 μm and provided entirely in the longitudinal direction, and a third gear 82 for driving is arranged at one end of the rotating shaft 92*f* The rotating shaft 92*f* is rotated in the clockwise direction in FIG. 4 by the third gear 82 to which driving force is sequentially transmitted from a first gear 80 and an idling, second gear 81 which are arranged on the shaft of the driving roller 72.

The toner removed by the blade 91 gradually begins to accumulate around the blade 91 and the sheet member 44, and the accumulated toner is pushed and supplied to the waste toner transport portion 92*d* while being agitated by the sheet member 92*e*. The waste toner transport portion 92*d* includes a screw 60 that transports the toner supplied by the sheet member 92*e* to the driving side in the longitudinal direction (the direction indicated by the arrow BB in FIG. 2). The screw 60 is connected with a fourth gear 83 for driving at the end on the non-driving side in the longitudinal direction and is rotated by engaging with the third gear 82 that drives the sheet member 92*e*.

In the waste toner transport portion 92*d*, the toner transported toward the driving side in the direction of the rotation axis of the screw 60 reaches the toner transport path 761 located at the driving side end of the toner transport portion 92. As shown in FIG. 3A, the toner transport path 761 has a slope shape and is formed at a slope angle greater than the angle at which the toner falls under its own weight. As shown in FIG. 3B, the toner transported to the toner transport path 761 by the rotation of the screw 60 is transported to the inlet 763 of the collecting container 75 by the toner's own weight. The toner T transported to the inlet 763 is diffused and fills the collecting container 75 by a toner diffusing member such as a screw and a paddle (not shown) arranged in the collecting container 75 to fill the inside of the collecting container 75 with toner.

Sealing by Belt Cleaning Device According to Comparative Example

Now, sealing by the belt cleaning device 9 to prevent waste toner leakage will be described. Before describing the embodiment of the present invention, a comparative example as exemplary conventional sealing will be described with reference to FIGS. 12A to 12C.

Figure 12A:
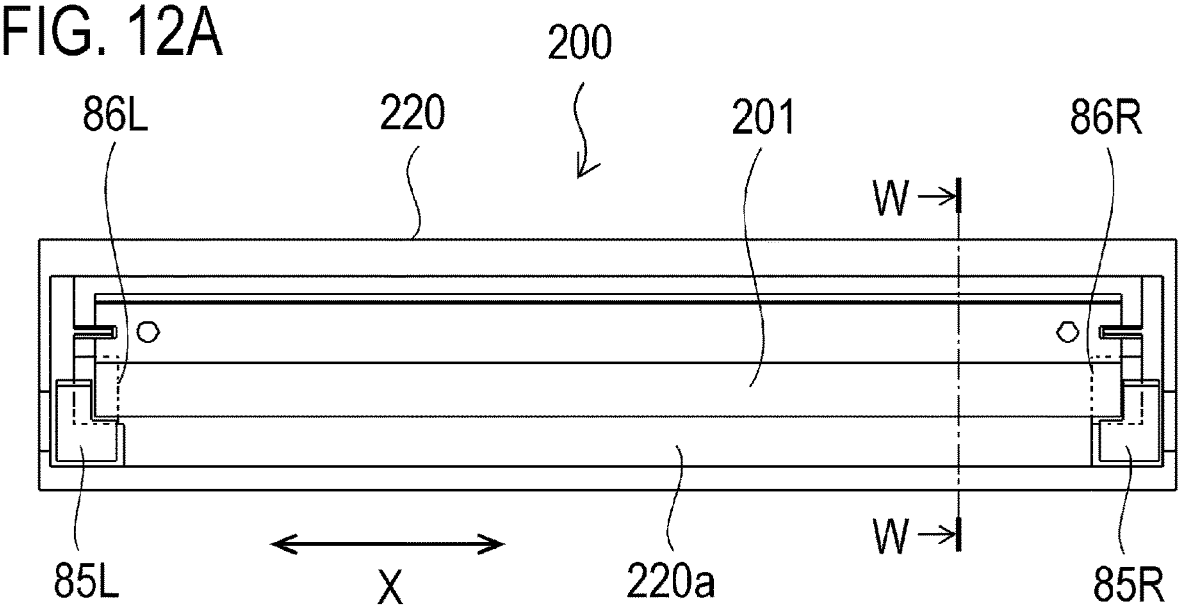
FIGS. 12A to 12C are schematic views for illustrating sealing by a cleaning device according to a comparative example.
Figure 12B:
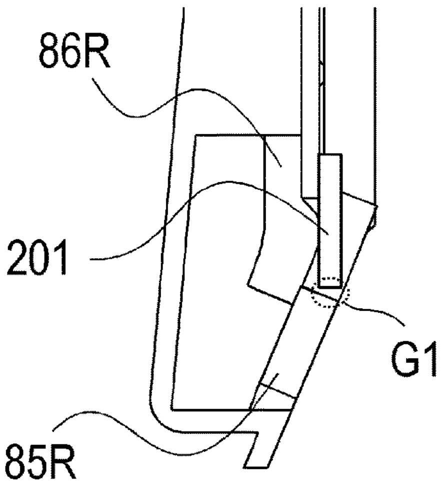
Figure 12C:
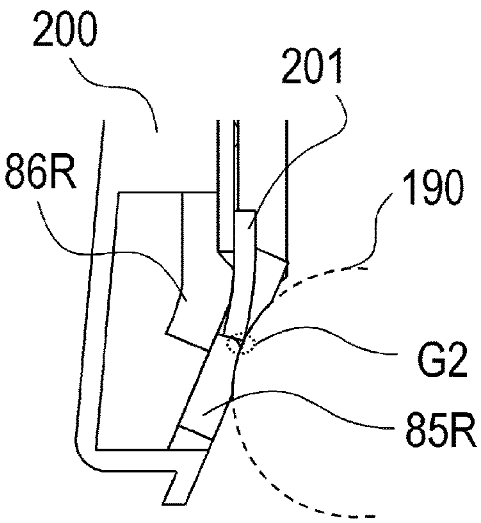

FIGS. 12A to 12C show sealing by a cleaning device 200 according to the comparative example. FIG. 12A is an overall view of the conventional cleaning device 200. FIG. 12B is a cross-sectional view taken along W-W in FIG. 12A and shows the state before a photosensitive drum 190 is assembled. FIG. 12C is a cross-sectional view taken along W-W in FIG. 12A and shows the state in which the photosensitive drum 190 is assembled. The photosensitive drum 190 is a member elongated in the direction of the rotation axis (the direction indicated by the arrow X in FIG. 12A).

The cleaning device 200 includes elastic members 86R and 86L provided near the opposed ends of a cleaning blade 201 in the longitudinal direction to prevent waste toner from leaking from the gap between a cleaning frame 220 and the cleaning blade 201. The cleaning device 200 also includes end seal members 85R and 85L provided near the ends of the cleaning blades 201 in the longitudinal direction to prevent waste toner from leaking from the gap between the cleaning frame 220, the photosensitive drum 190, and the cleaning blade 201. The end seal members 85R and 85L are provided on the elastic members 86R and 86L, respectively.

When the end seal member 85R and the cleaning blade 201 are attached on the cleaning frame 220, a gap G1 as shown in FIG. 12B is provided to prevent one from riding up on the other or deforming in an unintended direction due to mutual interference. The photosensitive drum 190 is then attached to abut against the end seal member 85R and the cleaning blade 201. At the time, depending on the initial position of the end seal member 85R and the cleaning blade 201, a gap G2 may be generated between the end seal member 85R, the cleaning blade 201, and the photosensitive drum 190, and the presence of the gap G2 is undesirable from the viewpoint of preventing waste toner leakage. However, in order to make the gap G2 small enough to have no influence, the cleaning blade 201, the end seal members 85R and 85L, the elastic members 86R and 86L, and other elements must be attached with high precision, which may give rise to increase in manufacturing costs.

Sealing by Belt Cleaning Device According to Embodiment

Figure 5:
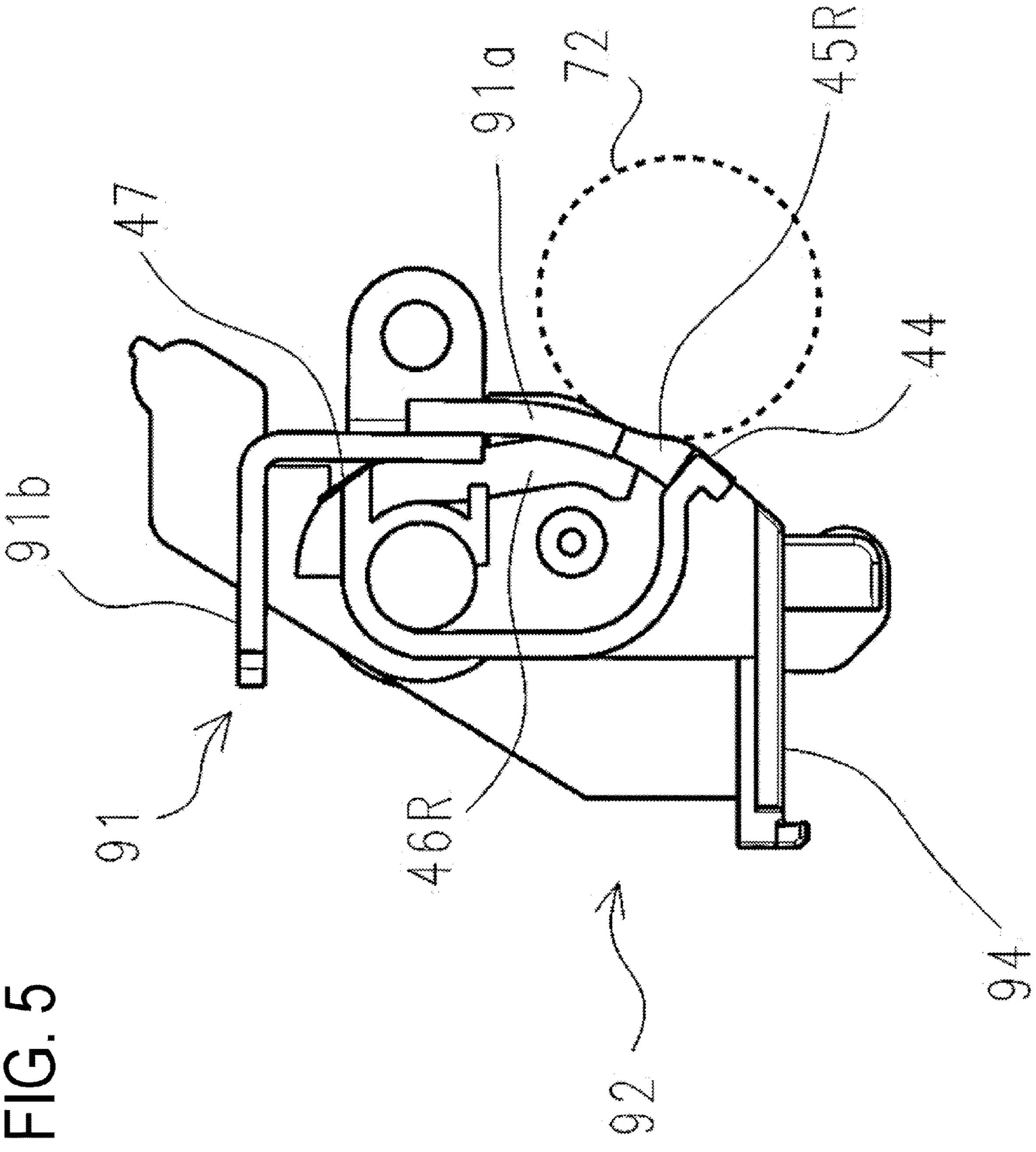
FIG. 5 is a sectional view for illustrating sealing by the cleaning device according to the embodiment.

Now, with reference to FIG. 5, sealing by the belt cleaning device 9 according to the embodiment will be described in detail. FIG. 5 is a cross-sectional view for illustrating how toner is sealed at the driving side end of blade 91 in the longitudinal direction. The blade 91 has the same structure on the non-driving side as that of the driving side and is symmetrical in the longitudinal direction. The toner transport portion 92 includes the sheet member 44, end seal members 45R and 45L, elastic members 46R and 46L, and a blowout prevention sheet 47 as seal members to prevent waste toner leakage.

The sheet member 44 is a flexible sheet member that prevents leakage of waste toner from the gap between the container body 94 and the intermediate transfer belt 71 in the transverse direction orthogonal to the longitudinal direction of the toner transport portion 92. The sheet member 44 extends in the width direction of the intermediate transfer belt 71 and is provided on the container body 94 so as to oppose the tip portion of the rubber part 91*a* of the blade 91 and abut against the intermediate transfer belt 71.

The blowout prevention sheet 47 is a flexible sheet member that prevents waste toner from leaking from the gap between the container body 94 and the retention sheet metal 91*b* in the transverse direction of the toner transport portion 92. The blowout prevention sheet 47 is placed on the container body 94 so as to abut against the retention sheet metal 91*b*.

Figure 6A:
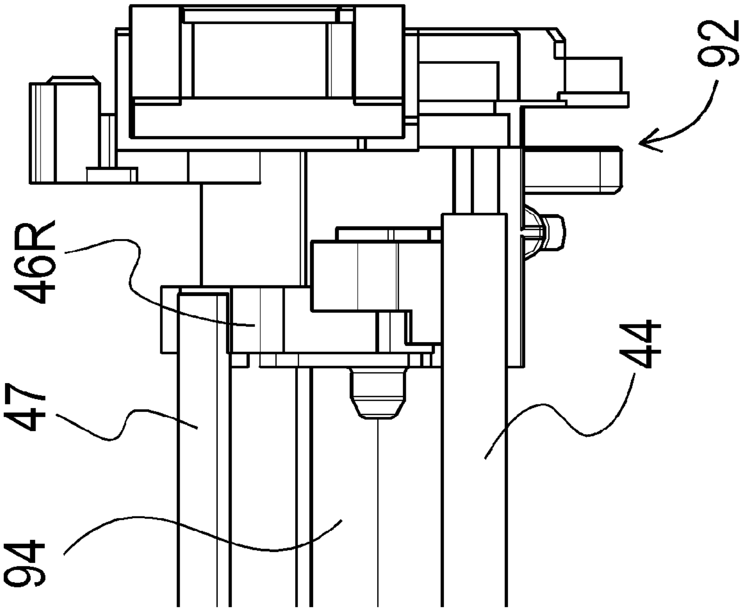
FIGS. 6A and 6B are top views for illustrating sealing by the cleaning device according to the embodiment.
Figure 6B:
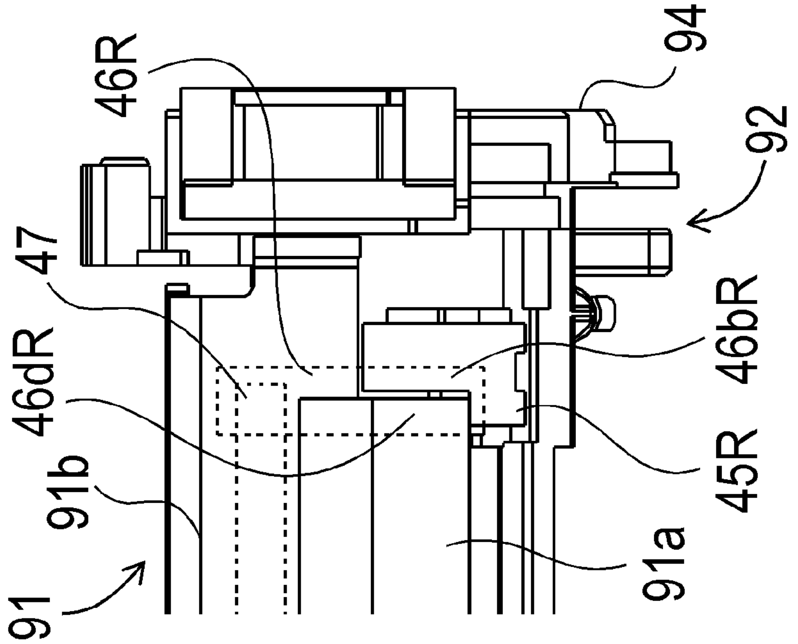

Next, the elastic members 46R and 46L will be described with reference to FIGS. 6A and 6B. FIG. 6A is a view of the driving side end of the toner transport portion 92 before the end seal member 45R is assembled onto the container body 94 as viewed from the side that abuts against the driving roller 72. FIG. 6B is a view of the toner transport portion 92 and the blade 91 with the end seal member 45R assembled thereto as viewed from the side that abuts against the driving roller 72. Hereinafter, the detailed structure of the elastic member 46R and the end seal member 45R on the driving side will be described. The elastic member 46L and the end seal member 45L on the non-driving side are symmetrical to the members on the driving side and have the same structure, and therefore the description will not be provided.

The elastic member 46R according to the embodiment is a foam of synthetic resin such as polyurethane and is attached to the container body 94 with double-sided tape. Any of other materials such as synthetic rubber, natural rubber and thermoplastic elastomer may be used for the elastic member 46R. As shown in FIG. 6B, the elastic member 46R is positioned nearer to the center in the longitudinal direction about in the range from 0 mm to 10 mm from the longitudinal end of the urethane rubber part 91*a* of the blade 91. More specifically, the elastic member 46R is provided near the end of the urethane rubber part 91*a* to overlap the urethane rubber part 91*a* when viewed in a direction orthogonal to the longitudinal direction. The elastic member 46R also has a longitudinal seal portion 46*d*R and a bearing surface 46*b*R which is a bearing surface for attaching the end seal member 45R. The longitudinal seal portion 46*d*R can prevent waste toner from leaking from the gap between the longitudinal ends of the blade 91 and the container body 94.

The blowout prevention sheet 47 extending in the longitudinal direction of the toner transport portion 92 is in contact with the elastic members 46L and 46R at the ends in the longitudinal direction and contacts the retention sheet metal 91*b* while compressing the elastic members 46L and 46R. This can prevent waste toner from leaking from the gap between the blowout prevention sheet 47, the elastic members 46L and 46R, and the retention sheet metal 91*b*.

The end seal member 45R is provided near the end of the urethane rubber part 91*a* in the longitudinal direction. The end seal member 45R is provided to have at least a part of thereof abut against and opposed to the tip portion of the urethane rubber part 91*a*. The end seal member 45R is compressed between the intermediate transfer belt 71 and the container body 94 and is provided in contact with the elastic member 46R. The end seal member 45R can prevent waste toner from leaking from the gap between the blade 91, the intermediate transfer belt 71, the elastic member 46R, and the container body 94.

Detailed Structure of End Seal Member

Figure 7:
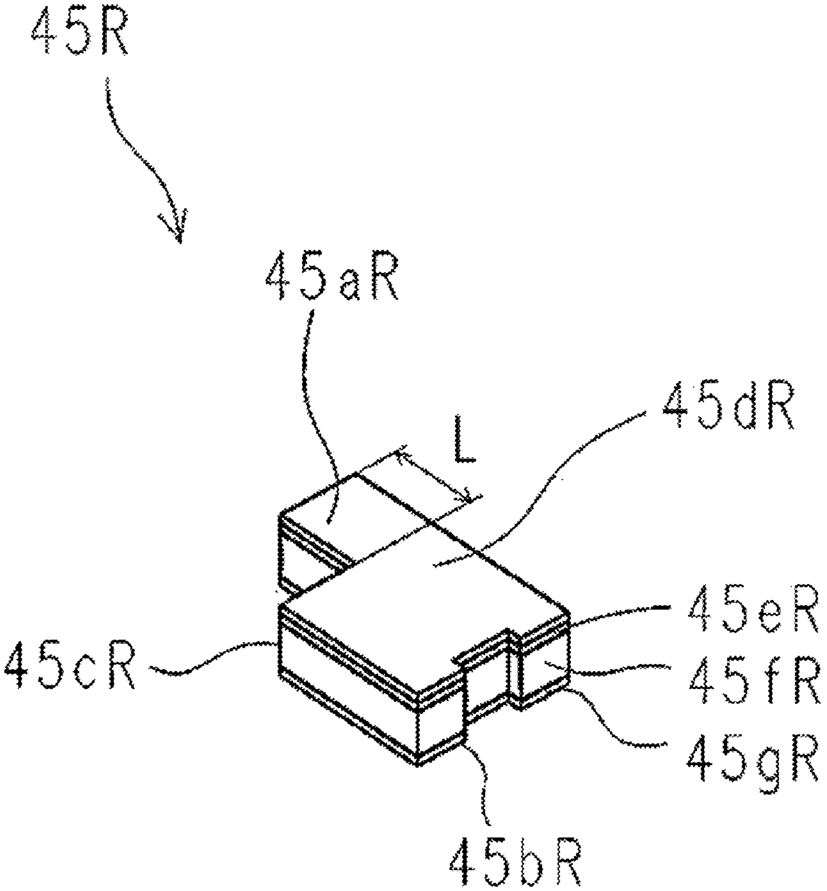
FIG. 7 is a perspective view of an end seal member according to the embodiment.

Next, the structure of the end seal member 45R will be described with reference to FIG. 7. The end seal member 45R has a substantially L-shape with a protruded portion 45*a*R having a length L. The end seal member 45R also has an affixing surface 45*b*R to be affixed to the elastic member 46R and a contact surface 45*e*R to abut against the tip portion of the urethane rubber part 91*a*. The end seal member 45R according to the embodiment has a four-layer structure including a surface layer 45*d*R, an adhesive layer 45*e*R, an intermediate layer 45*f*R, and an affixing layer 45*g*R.

The protruded portion 45*a*R is adjacent to the tip portion of the urethane rubber part 91*a* in the longitudinal direction when the end seal member 45R is attached to the intermediate transfer unit 7, and the portion extends from the tip side of the urethane rubber part 91*a* toward the base side. In this way, the end seal member 45R can prevent toner leakage from the intermediate transfer unit 7 as the end seal member 45R has the protruded portion 45*a*R. Although an example of the end seal member 45R is shown in FIG. 7, the length L of the protruded portion 45*a*R may be determined in consideration of sealing performance. If the urethane rubber part 91*a* has sufficient sealing performance at the tip, the protruded portion 45*a*R does not have to be provided.

The surface layer 45*d*R has a surface that abuts against the intermediate transfer belt 71. The surface layer 45*d*R includes a base fabric and pile yarns raised from the base fabric, but may be made of only the base fabric. The surface layer 45*d*R is bonded to the surface of the intermediate layer 45*f*R through the affixing layer 45*e*R such as double-sided tape or an adhesive. The base fabric can be a woven fabric made by weaving warp and weft yarns together, a knitted fabric made by knitting yarns together, or a nonwoven fabric made by joining fibers together. Examples of the method for making nonwoven fabric may include joining fibers by spraying the fibers with heated steam, melting fibers together with heat, and entangling fibers with a high-pressure water stream. Raised pile yarns can be looped or have loops cut and raised one by one. If only a base fabric is used, yarns may be electrostatically planted on the base fabric to create a raised base fabric.

Examples of the material of the surface layer 45*d*R may include polyethylene, polypropylene, polyester, nylon, and acrylic resin. Furthermore, the material of the surface layer 45*d*R can be any of synthetic fibers such as polyethylene terephthalate, semi-synthetic fibers such as rayon, and natural fibers such as cotton, or a combination of these having been twisted. Alternatively, the surface layer 45*d*R may be coated with a lubricant such as silicone resin and zinc stearate. Note that any other material may be used for the surface layer 45*d*R that has high heat resistance, durability, and abrasion resistance and that allows sufficient adhesive strength with the adhesive layer 45*e*R to be maintained.

The intermediate layer 45*f*R is a cushion layer made of an elastic material. Examples of the material of the intermediate layer 45*f*R may include a foam of synthetic resin such as polyurethane, and a material such as synthetic rubber, natural rubber, and thermoplastic elastomer. Any other material may be used for the intermediate layer 45*f*R that has heat resistance and durability and allows sufficient adhesive strength with the adhesive layer 45*e*R and the lamination layer 45*g*R to be maintained.

The affixing layer 45*g*R is provided on the back side of the intermediate layer 45*f*R, is formed by double-sided tape or a pressure-sensitive adhesive and has the affixing surface 45*b*R. Any other material may be used for the affixing layer 45*g*R that has flexibility and allows sufficient adhesive strength with the intermediate layer 45*f*R to be maintained.

According to the embodiment, the end seal member 45R has a four-layer structure including the surface layer 45*d*R, the adhesive layer 45*e*R, the intermediate layer 45*f*R, and the affixing layer 45*g*R as an example, but the member may also have a two-layer structure including the surface layer 45*d*R and the affixing layer 45*g*R. In this case, the layer must have a certain thickness for example by using a non-woven fabric as the material of the surface layer 45*d*R. Since the end seal member 45L is symmetrical in shape and has the same structure as the end seal member 45R, the description will not be provided.

Assembling Intermediate Transfer Unit

Next, a method for assembling the intermediate transfer unit 7 will be described with reference to FIGS. 8A, 8B, 9A, 9B, 10, and 11. In assembling the intermediate transfer unit 7, a belt unit 95 is first assembled by attaching the blade 91 to the support plates 77 and 78 as the frames, and then bringing the blade 91 into abutment against the intermediate transfer belt 71 stretched by the driving roller 72. The belt unit 95 includes the frame 76 and the collecting container 75 in addition to the members described above. The toner transport portion 92 provided with the end seal members 45R and 45L is then attached to the belt unit 95. More specifically, the intermediate transfer unit 7 is assembled by attaching the toner transport portion 92 as a second unit to the belt unit 95 as a first unit. When the toner transport portion 92 is attached to the belt unit 95, the end seal members 45R and 45L contact the blade 91 and the intermediate transfer belt 71. Finally, the blade 91 and the toner transport portion 92 are connected with the tension springs 93. The attaching steps will be described in detail.

Figure 8A:
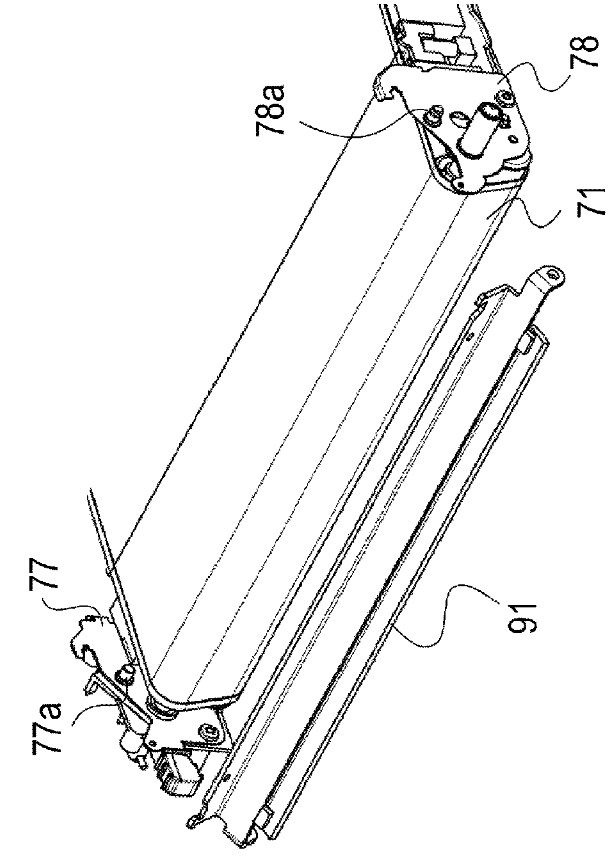
FIGS. 8A and 8B are perspective views for illustrating a method for attaching a cleaning blade according to the embodiment.
Figure 8B:
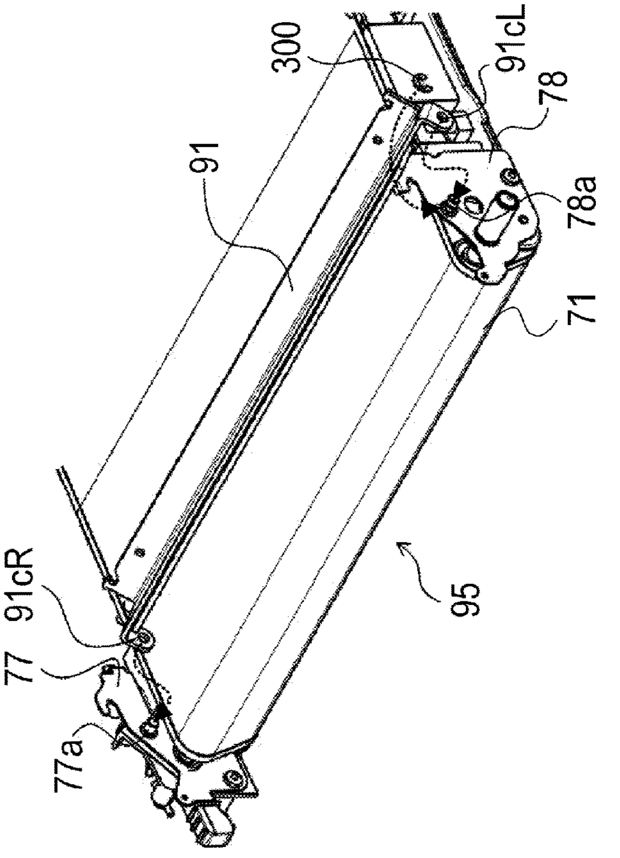

With reference to FIGS. 8A and 8B, a method for assembling the belt unit 95 will be described. FIG. 8A is an exploded perspective view of the belt unit 95. FIG. 8B is a perspective view for illustrating how the blade 91 is attached to the belt unit 95. The blade support shafts 77*a* and 78*a* for engaging and supporting the blade 91 are attached to and supported by the support plate 77 on the driving side and the support plate 78 on the non-driving side, respectively, for example by press-fitting. The blade support shafts 77*a* and 78*a* are provided to protrude from their respective plates in the same direction and to the non-driving side according to the embodiment. The blade 91 is attached from the non-driving side so that holes 91*c*R and 91*c*L engage the blade support shafts 77*a* and 78*a* and are retained for example by an E-ring 300. The blade 91 is shaped so that the urethane rubber part 91*a* generates a moment of its own weight in the direction in which the urethane rubber part 91*a* contacts the intermediate transfer belt 71, and the blade 91 may be temporarily fixed for example by a jig in order to maintain the contact state.

Figure 9B:
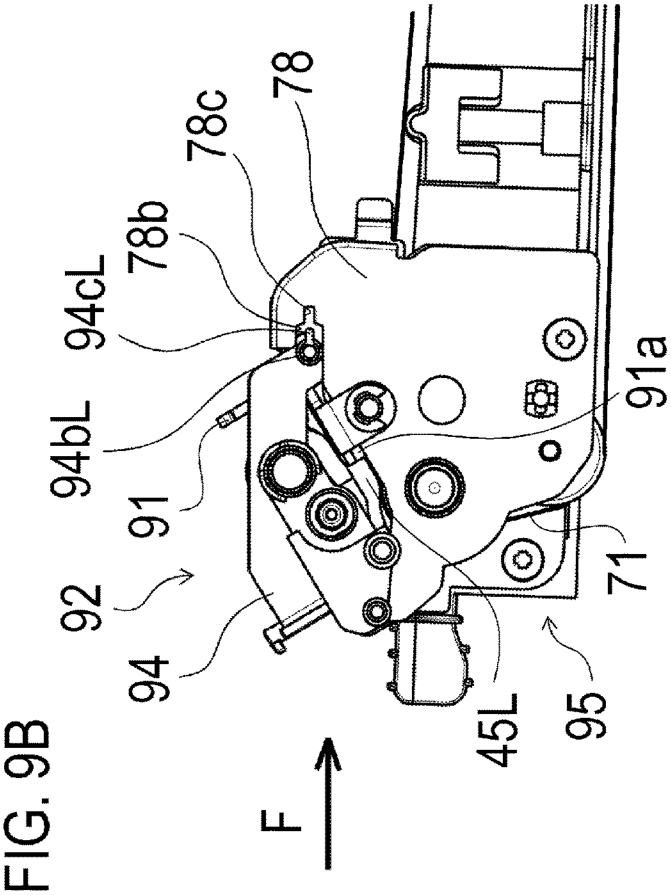
FIGS. 9A and 9B are side views for illustrating a method for assembling the intermediate transfer unit according to the embodiment.
Figure 9A:
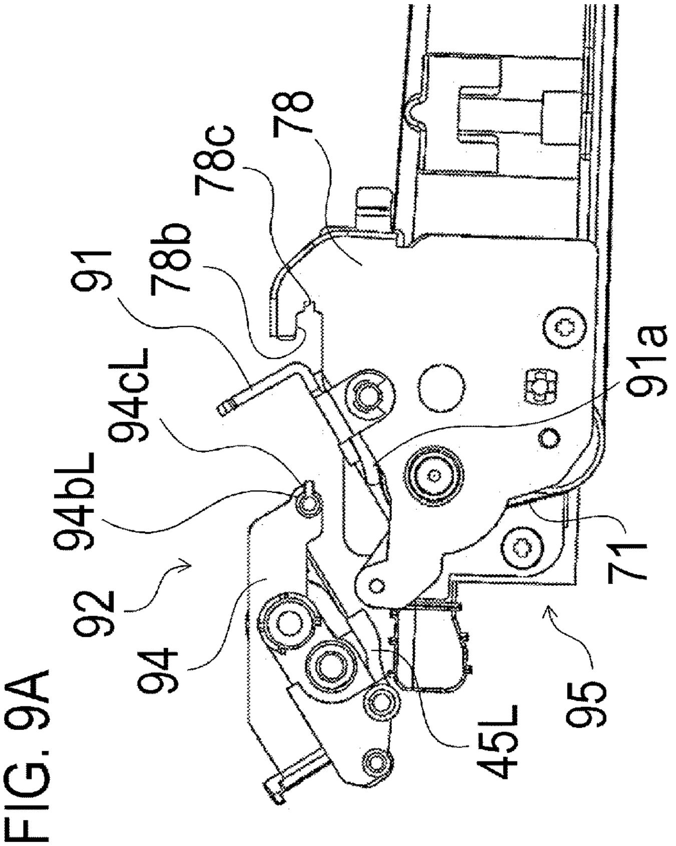
Figure 10:
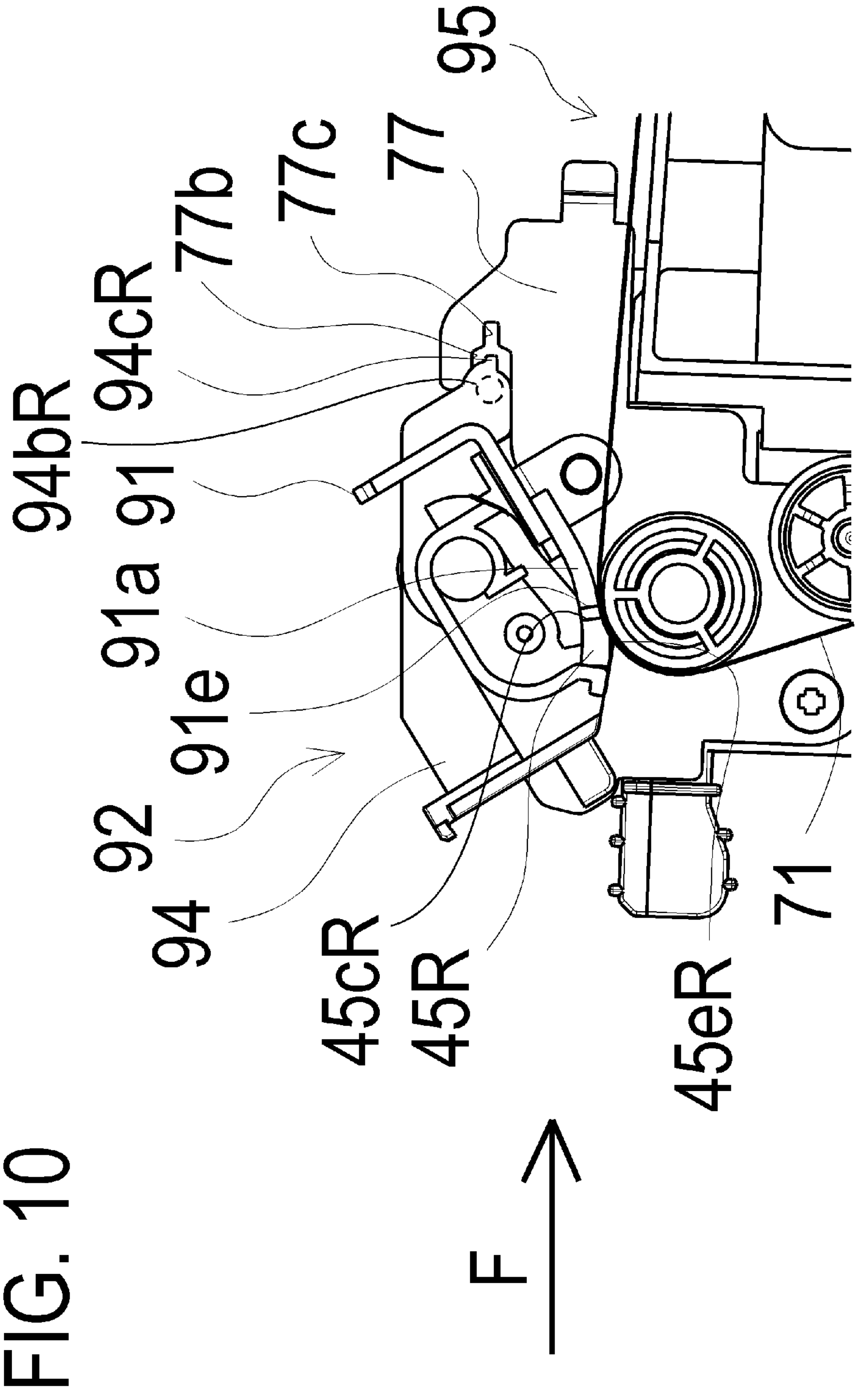
FIG. 10 is a sectional view for illustrating the method for assembling the intermediate transfer unit according to the embodiment.
Figure 11:
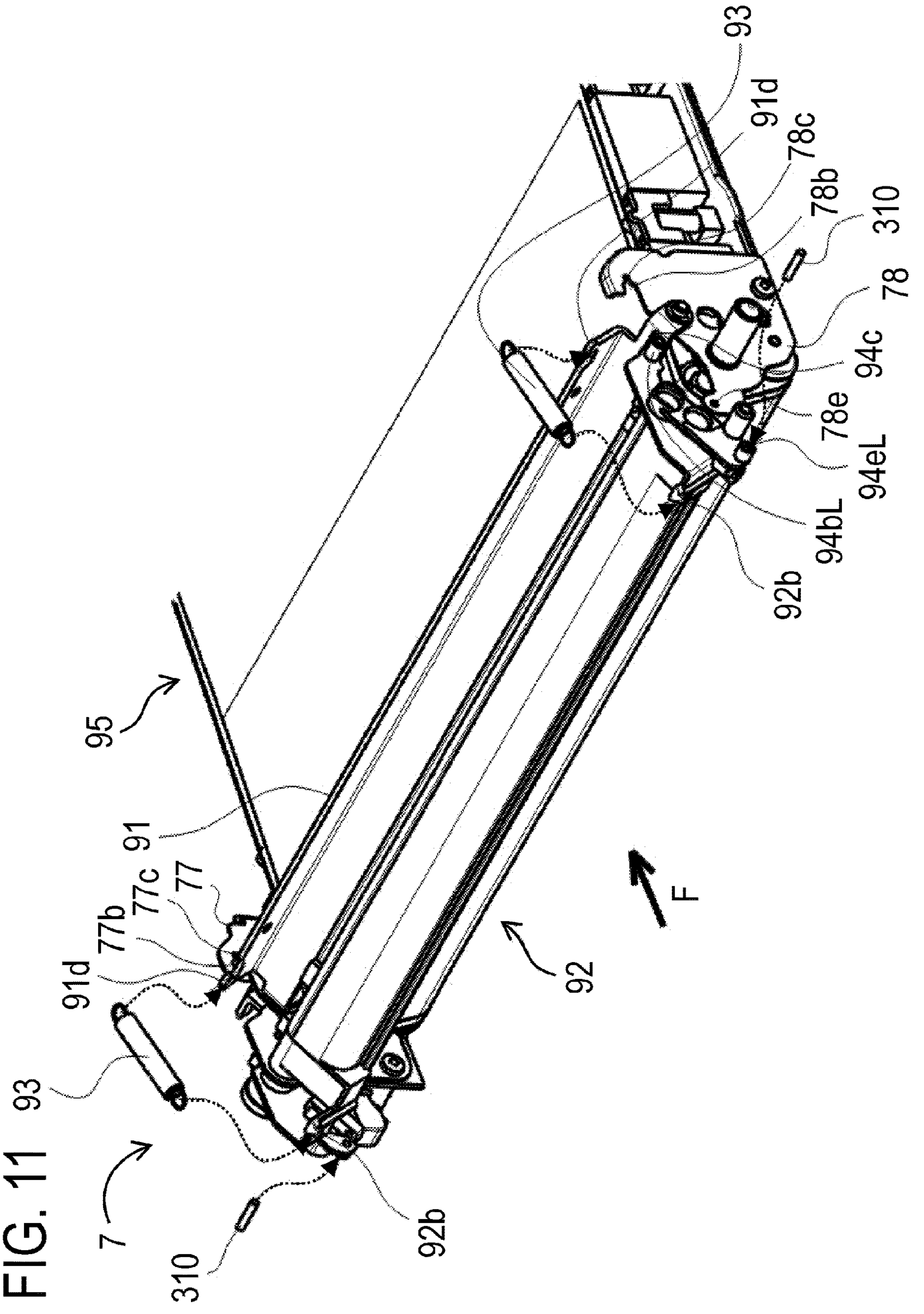
FIG. 11 is a perspective view for illustrating the method for assembling the intermediate transfer unit according to the embodiment.

With reference to FIGS. 9A, 9B, 10, and 11, how the toner transport portion 92 is attached to the belt unit 95 will be described. FIG. 9A is a side view of the belt unit 95 and the toner transport portion 92 before attachment. FIG. 9B is a side view for illustrating how the toner transport portion 92 is attached to the belt unit 95. FIG. 10 is a cross-sectional view for illustrating how the toner transport portion 92 is attached to the belt unit 95. FIG. 11 is a perspective view for illustrating how the tension springs 93 are attached to the blade 91 and the toner transport portion 92.

According to the embodiment, the toner transport portion 92 can be attached to the belt unit 95 by moving the toner transport portion in the attaching direction F orthogonal to the width direction of the intermediate transfer belt 71. When the toner transport portion 92 and the belt unit 95 engage with each other, the end seal members 45L and 45R provided in the belt unit 95 abut against the blade 91 in the toner transport portion 92 and the intermediate transfer belt 71. The toner transport portion 92 and the belt unit 95 engage with each other as the container body 94 as the frame (first frame) of the toner transport portion 92 (first unit) and the support plates 77 and 78 as the frame (second frame) of the belt unit 95 (second unit) engage with each other. The engagement will be described in detail.

The container body 94 has cylindrical protrusions 94*b*L and 94*b*R that protrude outwardly in the width direction at opposed ends in the width direction as engaging portions and convex portions 94*c*L and 94*c*R that protrude linearly downstream in the attaching direction F from the outer circumferential surfaces of the protrusions 94*b*L and 94*b*R. The support plate 78 also has a groove portion 78*b* linearly recessed in the attaching direction F as the engaging target portion, and a recessed portion 78*c* provided at the bottom of the groove portion 78*b*. Similarly to the support plate 78, the support plate 77 has a groove portion 77*b* and a recessed portion 77*c*. As shown in FIGS. 9A and 9B, when the toner transport portion 92 is attached to the belt unit 95, the protrusion 94*b*L engages with the groove portion 78*b* and the convex portion 94*c*L engages with the recessed portion 78*c*. The groove portion 78*b* and the recessed portion 78*c* restrict the attaching direction of the toner transport portion 92 to the belt unit 95 and function as guide portions to guide the toner transport portion 92. The convex portion 94*c*L engages with the recessed portion 77*c* to restrict the rotation of the toner transport portion 92 with respect to the belt unit 95, which allows the toner transport portion 92 to be attached with its posture fixed. Although the engagement on the non-driving side has been described with reference to FIGS. 9A and 9B, the protrusion 94*b*R and the convex portion 94*c*R engage with the groove portion 78*b* and the recessed portion 78*c* of the support plate 78 on the driving side in the same manner.

As described above, the attaching direction of the toner transport portion 92 is restricted, so that the surface layer 45*d*R of the end seal member 45R contacts the intermediate transfer belt 71 while the contact surface 45*c*R contacts the tip portion 91*e* of the urethane rubber part 91*a* as shown in FIG. 10. The urethane rubber part 91*a* is always kept in contact with the intermediate transfer belt 71 by the own weight of the blade 91. This can prevent the end seal members 45L and 45R from riding up on the blade 91 and from entering between the intermediate transfer belt 71, which allows the members to contact each other appropriately.

After the convex portion 94*c* engages with the recessed portion 77*c*, parts such as pins 310 are attached to secure the toner transport portion 92 and the belt unit 95. With reference to the non-driving side as an example, the pin 310 is inserted into the through hole 78*e* in the support plate 78 and the hole 94*e*L in the container body 94. The pin 310 is used in the same manner on the driving side, so that the toner transport portion 92 is fixed and supported by the support plate 78 and the support plate 77.

Furthermore, the tension springs 93 are attached to connect the toner transport portion 92 and the blade 91. The tension spring 93 has one end attached to the spring peg 92*b* of the toner transport portion 92 and the other end attached to the spring peg 91*d* of the blade 91. A moment is generated at the blade 91 by the contraction force of the tension springs 93, and this causes the urethane rubber part 91*a* to have press-contacting force with respect to the intermediate transfer belt 71.

The spring pegs 92*b* and 91*d* are positioned at substantially the same positions in the longitudinal direction of the blade 91 with respect to the support plates 77 and 78 which support and fix the toner transport portion 92. More specifically, the force the toner transport portion 92 receives from the tension springs 93 can be received by the support plates 77 and 78 which are strong sheet metal parts, so that the deformation of the toner transport portion 92 can be reduced to a minimized level. In this way, the toner transport portion 92 provided with the end seal member 45 can be strongly supported so that the unit does not move, and the sealing performance of each seal member is not compromised, which can prevent waste toner leakage.

As in the foregoing, according to the present invention, the end seal member 45 is allowed to abut against the blade 91 and the intermediate transfer belt 71 while the blade 91 and the intermediate transfer belt 71 abut each other in advance, so that the gap between various members can be eliminated to achieve high sealing performance and prevent toner leakage. In addition, since the blade 91 and the intermediate transfer belt 71 abut against each other in advance, the end seal member 45 does not enter between the blade 91 and the intermediate transfer belt 71 to create a gap when the toner transport portion 92 is attached. Furthermore, since the end seal member 45 contacts the blade 91 and the intermediate transfer belt 71 while elastically deforming, even if the position of the end seal member 45 deviates slightly from the designed position, the error is absorbed by the elastic deformation, and abutment with no gap can be achieved. Therefore, the affixing position of the end seal member 45 and the elastic member 46 does not need to be highly precise, and various members can be attached for example with double-sided tape, which results in reduced cost.

The above-described embodiment is an application of the present invention to the intermediate transfer unit 7 that transfers an image onto a transfer material such as a recording material as secondary transfer, but the application of the present invention is not limited to this embodiment. For example, the invention can also be applied to a process cartridge 19 that performs primary transfer and removes waste toner on photosensitive drum 1. Even in the process cartridge 19 including the cleaning device 6, high waste toner sealing performance and cost reduction can be achieved when a cleaning member such as a blade is in contact with the photosensitive drum in advance, and then an end seal member is brought into abutment in the state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-034925, filed on Mar. 8, 2022, which is hereby incorporated by reference herein in its entirety.

What is claimed is:

1. A transfer unit transferring a developer image onto a transfer medium, the transfer unit comprising:
- a first unit comprising: (1) an intermediate transfer belt on which the developer image is formed; (2) a cleaning blade provided to extend in a width direction of the intermediate transfer belt to abut against the intermediate transfer belt, and remove a developer on the intermediate transfer belt; and (3) a collecting container for collecting the developer removed by the cleaning blade; and
- a second unit comprising: (1) an end seal member to engage with the first unit, wherein the end seal member prevents the developer removed by the cleaning blade from leaking outside the transfer unit, the end seal member being opposed to a tip portion of the cleaning blade in a direction orthogonal to the width direction near an end of the cleaning blade in the width direction; and (2) a transport path for transporting the developer removed by the cleaning blade to the collecting container,
- wherein the second unit engages with the first unit so that the end seal member abuts against the cleaning blade and the intermediate transfer belt that abut against each other.

2. The transfer unit according to claim 1, wherein the end seal member abuts against the tip portion of the cleaning blade.

3. The transfer unit according to claim 1, wherein the tip portion of the cleaning blade abuts against the intermediate transfer belt.

4. The transfer unit according to claim 1, wherein the cleaning blade comprises (1) an elastic portion including the tip portion and configured to abut against the intermediate transfer belt and the end seal member, and (2) a retaining portion that retains the elastic portion.

5. The transfer unit according to claim 1, wherein the first unit further comprises a first frame that supports the intermediate transfer belt and the cleaning blade and that includes an engaging target portion, and
- wherein the second unit further comprises a second frame that supports the end seal member and that includes an engaging portion to engage with the engaging target portion.

6. The transfer unit according to claim 5, wherein the engaging target portion is a recessed portion recessed in a direction orthogonal to the width direction, and
- wherein the engaging portion is a convex portion that protrudes in the direction in which the recessed portion is recessed.

7. The transfer unit according to claim 1, wherein the end seal member includes a contact surface that abuts against (1) the tip portion of the cleaning blade and (2) a protruded portion of the cleaning blade adjacent to the tip portion in the width direction.

8. The transfer unit according to claim 1, wherein the cleaning blade abuts, from above, against the intermediate transfer belt.

9. The transfer unit according to claim 1, further comprising a tension spring that urges the cleaning blade toward the intermediate transfer belt.

10. The transfer unit according to claim 9, wherein the cleaning blade is provided rotatably around a rotation axis direction parallel to the width direction, and wherein the tension spring is a spring that urges the cleaning blade in a direction in which the cleaning blade is rotated.

11. The transfer unit according to claim 1, wherein the intermediate transfer belt is an endless belt stretched on a plurality of rollers, and wherein the first unit further comprises a roller opposed to the cleaning blade with the endless belt therebetween.

12. An image forming apparatus forming an image on a recording material, the image forming apparatus comprising:

a transfer unit for transferring an image; and a fixing unit for fixing the image on the recording material, wherein the transfer unit comprises:

(A) a first unit comprising: (1) an intermediate transfer belt on which a developer image is formed; (2) a cleaning blade provided to extend in a width direction of the intermediate transfer belt to abut against the intermediate transfer belt, and remove a developer on the intermediate transfer belt; and (3) a collecting container for collecting the developer removed by the cleaning blade; and (B) a second unit comprising: (1) an end seal member to engage with the first unit, wherein the end seal member prevents the developer removed by the cleaning blade from leaking outside the transfer unit, the end seal member being opposed to a tip portion of the cleaning blade in a direction orthogonal to the width direction near an end of the cleaning blade in the width direction; and (2) a transport path for transporting the developer removed by the cleaning member to the collecting container, and wherein the second unit engages with the first unit so that the end seal member abuts against the cleaning blade and the intermediate transfer belt that abut against each other.

13. The image forming apparatus according to claim 12, wherein the transfer unit is detachably attached to an apparatus body of the image forming apparatus.

14. A transfer unit comprising:

a first unit comprising: (1) an intermediate transfer belt on which a developer image is formed; (2) a cleaning blade provided to extend in a width direction of the intermediate transfer belt to abut against the intermediate transfer belt, and remove a developer on the intermediate transfer belt; and (3) a collecting container for collecting the developer removed by the cleaning blade; and a second unit comprising: (1) an end seal member to engage with the first unit, wherein the end seal member prevents the developer removed by the cleaning blade from leaking outside the transfer unit, the end seal member being opposed to a tip portion of the cleaning blade in a direction orthogonal to the width direction; and (2) a transport path for transporting the developer removed by the cleaning blade to the collecting container, wherein the second unit engages with the first unit so that the end seal member abuts against the cleaning blade and the intermediate transfer belt that abut against each other.

15. An image forming apparatus comprising:

the transfer unit according to claim 14; and a fixing unit for fixing an image on a recording material.

* * * * *